United States Patent [19]
Gendol et al.

[11] Patent Number: 5,137,341
[45] Date of Patent: Aug. 11, 1992

[54] PRESCRIPTION LENS CARRIER

[75] Inventors: Clark L. Gendol, Sturbridge; Arlene J. Philla, W. Boyleston, both of Mass.

[73] Assignee: American Optical Corporation, Southbridge, Mass.

[21] Appl. No.: 814,204

[22] Filed: Dec. 20, 1991

Related U.S. Application Data

[63] Continuation of Ser. No. 530,923, May 20, 1990, abandoned.

[51] Int. Cl.$^5$ .................................................. G02C 1/00
[52] U.S. Cl. ...................................... 351/43; 351/86; 2/934; 2/441; 2/493
[58] Field of Search ................... 351/43, 62, 86, 154; 3/426, 428, 430, 434, 441, 442, 443

[56] References Cited

U.S. PATENT DOCUMENTS

| | | | |
|---|---|---|---|
| 1,584,259 | 5/1926 | Tully | 351/86 |
| 1,742,412 | 1/1930 | O'Flannagan | 351/43 |
| 3,259,909 | 7/1966 | Wood | 351/154 |
| 3,440,662 | 4/1966 | O'Shen | 2/441 |
| 3,944,345 | 3/1976 | Decorato | 351/43 |

Primary Examiner—Rodney B. Bovernick
Assistant Examiner—J. P. Ryan
Attorney, Agent, or Firm—Fishman, Dionne & Cantor

[57] ABSTRACT

A protective optical device is disclosed. The device includes a transparent shield for protecting a portion of the wearers face and a device for mounting an ophthalmic lens in the transparent shield. The mounting device includes an aperture through the transparent shield, a wall surrounding the aperture and extending forwardly from the shield to a front edge, and a shoulder surrounding the front edge for securing an ophthalmic lens to the front edge. The device allows standard ophthalmic lens to be securely mounted in a protective shield and minimizes the number of lens surfaces of the device.

8 Claims, 1 Drawing Sheet

PRESCRIPTION LENS CARRIER

The Government may have rights in this invention pursuant to Contract No. DLA-900-86-C-2045 awarded by the Department of the Army.

This is a continuation of copending application Ser. No. 07/530,923 filed on May 20, 1990, now abandoned.

TECHNICAL FIELD The present invention pertains to the art of protective optical devices.

BACKGROUND OF THE INVENTION

In situations wherein a prescription lens user must also use a device having a plano protective lens, e.g. scuba mask, gas mask, respirator, it is desirable to mount the prescription lens in the protective device to provide an optical system. Conventional methods for mounting the prescription lenses include mounting the prescription lens behind or in front of the plano lens or by cementing the prescription lens to the plano lens.

Each of the conventional mounting methods have disadvantages.

A prescription lens mounted behind or in front of plano lens may become dislodged during use. If a prescription lens mounted behind the plano lens, i.e. between the plano lens and the wearers eye, becomes dislodged, the wearer must remove the protective device in order to remount the prescription lens. The prescription lens may cause discomfort or injury while dislodged by contacting the wearers facial features. If a prescription lens mounted in front of the plano lens becomes dislodged, the prescription lens may be lost.

Mounting a prescription lens in back of or in front of a plano lens juxtaposes a number of lens surfaces, which the wearer must look through. The optical performance of an optical system having a plurality of juxtaposed lens surfaces is compromised by reflections within the system. Performance may be improved by using expensive antireflective coatings.

Cementing the prescription lens to a plano lens requires a special prescription lens design whenever every lens in the series has the same back curve, i.e. a series of plus toric lenses. Such lenses are not standard in the ophthalmic industry and typically it would not be cost effective to stock a wide prescription range of such lenses for such a restricted purpose.

SUMMARY OF THE INVENTION

A protective optical device is disclosed. The device includes a transparent means for protecting a portion of a wearers face and a means for mounting an ophthalmic lens in the transparent means. The means for mounting comprises an aperture through the transparent means, a wall surrounding the aperture and extending forwardly from the transparent means to a front edge, a means for securing the ophthalmic lens to the front edge. The device of the present invention allows standard ophthalmic lenses to be securely mounted in a protective device and minimizes the number of lens surfaces that the wearer must look through.

BRIEF DESCRIPTION OF THE INVENTION

DETAILED DESCRIPTION OF THE INVENTION

Figure 1:
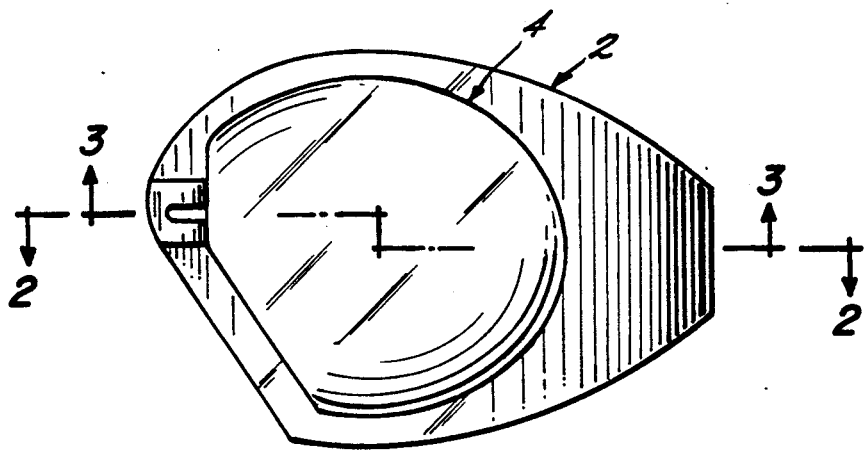
FIG. 1 shows a front view of the lens carrier of the present invention.

FIG. 1 shows a front view of the protective ophthalmic device of the present invention. The device includes a transparent shield 2, and an ophthalmic lens 4 mounted on the shield 2. The shield 2 may comprise any transparent material, e.g. a glass, a thermoset polymer or a thermoplastic polymer. The lens 4 may be any ophthalmic lens, e.g. a plano lens, a positive power lens or a negative power lens. The ophthalmic device of the present invention may be mounted in any conventional form of protective headgear, e.g. a scuba mask, a respirator or a gas mask, to provide a protective device having prescription ophthalmic lenses.

Figure 2:
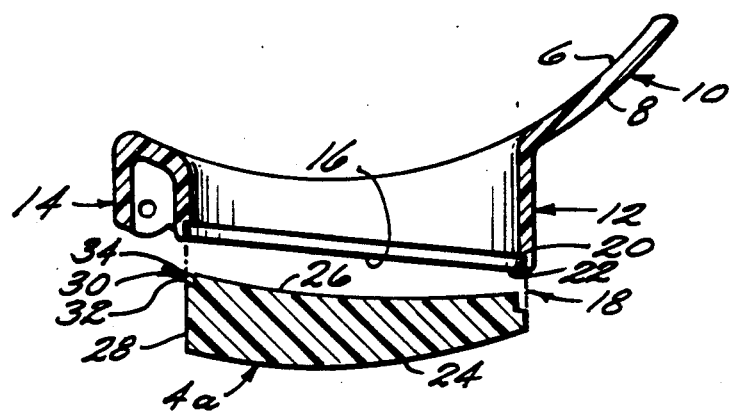
FIG. 2 shows a cross sectional view along line 2—2 of FIG. 1.

FIG. 2 shows a cross sectional view of a first embodiment of the present invention taken along line 2—2 in FIG. 1. The shield 2 has an inner surface 6 and an outer surface 8. The shield 2 includes a convex wall portion 10, an annular wall portion 12 and an attachment member 14 for mounting the shield 2 in protective headgear (not shown). The annular wall portion 12 extends forwardly from the convex wall portion 10 to a front edge 16 and surrounds an aperture formed in the convex wall portion 10. An annular step 18 having a back surface 20 and a peripheral surface 22 is formed at the intersection of inner surface 6 and front edge 16 of shield 2.

Lens 4a is a positive power lens having a front surface 24, a back surface 26 and a peripheral surface 28 between the front and back surfaces 24, 26. An annular step 30 having a back surface 32 and a peripheral surface 34 is defined around the perimeter of lens 4a at the intersection of the back surface 26 and the peripheral surface 28. Step 18 of shield 2 engages step 30 of lens 4a to locate the lens 4a relative to the shield 2.

Figure 3:
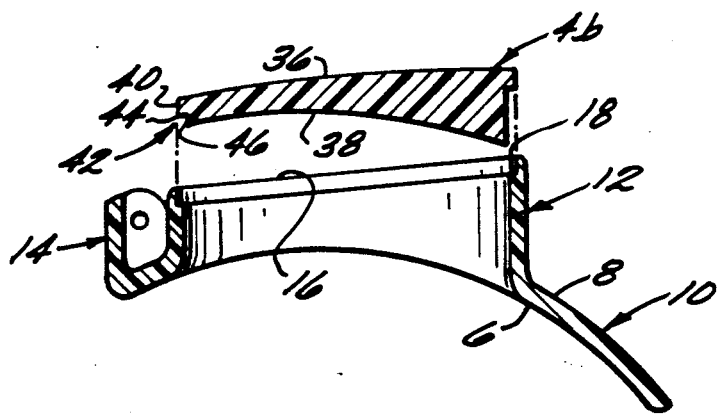
FIG. 3 shows a cross sectional view along line 3—3 of FIG. 1.

FIG. 3 shows a cross sectional view of a second embodiment of the present invention, taken along line 3—3 in FIG. 1.

Lens 4b is a negative power lens having a front surface 36, a back surface 38 and a peripheral surface 40 between the front and back surfaces 36 and 38. An annular step 42 having a back surface 44 and a peripheral surface 46 is formed around the perimeter of lens 4b at the intersection of back surface 38 and peripheral surface 40. The step 18 of shield 2 engages the step 42 of lens 4b to locate lens 4b relative to the shield 2.

In either of the embodiments shown the engagement between the shield 2 and the lens 4 may be maintained by any convenient means. For example, the lens 4 may be retained in engagement with shield 2 by an interference fit between the shield 2 and the lens 4, by a mechanical clamp, or by an adhesive bond between the lens 4 and the shield 2. Preferably, the lens 4 is retained in engagement with shield 2 by adhesive bond between the shield 2 and the lens 4.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. An improved protective device, said device including a protective lens for protecting a portion of the wearers face, said facial portion including the wearers eyes, and means for mounting the protective lens in front of the facial portion, wherein the improvement comprises:

the protective lens comprising transparent shield means for protecting a portion of the facial portion, said shield means having an aperture therethrough and including an annular wall surrounding the aperture and extending forwardly to a front edge;

mounting means for mounting an ophthalmic lens on the front edge of the annular wall to cover the aperture; the annular wall having an inner surface wherein the mounting means includes an annular step formed in the inner surface of the wall and spaced backwardly from said front edge of said wall; and an ophthalmic lens mounted on the front edge of the annular wall, said lens including a front surface and a rear surface, said lens including a peripheral step spaced forwardly from said rear surface, said peripheral step being complimentary to the annular step of the wall, and said annular and peripheral steps cooperating to locate the lens relative to the annular wall.

2. The device of claim 1 wherein the device is a device selected from the group consisting of a scuba mask, a gas mask and a respirator.

3. The device of claim 1, wherein the transparent shield means comprises a glass, a thermoplastic polymer or a thermoset polymer.

4. The device of claim 1, wherein the ophthalmic lens is a positive power lens.

5. The device of claim 1, wherein the ophthalmic lens is a negative power lens.

6. The device of claim 1, wherein the ophthalmic lens is a plano lens.

7. The device of claim 1, wherein the ophthalmic lens is secured to the wall by an adhesive composition.

8. The device of claim 1, wherein the ophthalmic lens is secured to the wall by frictional interaction between the ophthalmic lens and the wall.

* * * * *